US010923241B2

(12) United States Patent
Arai et al.

(10) Patent No.: US 10,923,241 B2
(45) Date of Patent: Feb. 16, 2021

(54) CONCRETE CASK

(71) Applicant: HITACHI ZOSEN CORPORATION, Osaka (JP)

(72) Inventors: Hiroaki Arai, Osaka (JP); Keisuke Okada, Osaka (JP); Masanori Goto, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 3 days.

(21) Appl. No.: 16/337,708

(22) PCT Filed: Sep. 26, 2017

(86) PCT No.: PCT/JP2017/034661
§ 371 (c)(1),
(2) Date: Mar. 28, 2019

(87) PCT Pub. No.: WO2018/062138
PCT Pub. Date: Apr. 5, 2018

(65) Prior Publication Data
US 2020/0035371 A1    Jan. 30, 2020

(30) Foreign Application Priority Data

Sep. 30, 2016    (JP) .............................. JP2016-192386

(51) Int. Cl.
*G21F 5/10* (2006.01)
*G21F 5/002* (2006.01)
(Continued)

(52) U.S. Cl.
CPC ................ *G21F 5/10* (2013.01); *G21F 5/002* (2013.01); *G21F 9/22* (2013.01); *G21F 5/12* (2013.01)

(58) Field of Classification Search
CPC . G21F 5/00; G21F 5/002; G21F 5/005; G21F 5/008; G21F 5/06; G21F 5/10; G21F 5/12; G21F 9/22; G21F 9/34
See application file for complete search history.

(56) References Cited

U.S. PATENT DOCUMENTS 3,113,215 A * 12/1963 Allen ........................ G21F 5/10
250/506.1
4,299,659 A * 11/1981 Hame ....................... G21F 9/34
376/272
(Continued)

FOREIGN PATENT DOCUMENTS

JP    56-012593 A    2/1981
JP    07-027897 A    1/1995
(Continued)

OTHER PUBLICATIONS

International Search Report PCT/JP2017/034661 dated Dec. 5, 2017 with English translation.
(Continued)

*Primary Examiner* — Wyatt A Stoffa
(74) *Attorney, Agent, or Firm* — Pillsbury Winthrop Shaw Pittman, LLP (57) ABSTRACT

A concrete cask enabling suppression of occurrence of stress corrosion cracking (SCC) in a lid welded part of a canister. The concrete cask includes: a metal canister accommodating spent fuel; a concrete container body for accommodating the canister inside the container body; a cooling passage provided between the external peripheral surface of the canister and the internal peripheral surface of the container body, and allowing air for cooling the external peripheral surface of the canister to pass; and a top space provided between the top surface part of the canister, and the inside of a lid of the container body. A baffle plate for suppressing introduction of (Continued)

air rising through the cooling passage to the top space is provided.

4 Claims, 12 Drawing Sheets

(51) Int. Cl.
*G21F 9/22* (2006.01)
*G21F 5/12* (2006.01)

(56) References Cited

U.S. PATENT DOCUMENTS

| | | | |
|---|---|---|---|
| 4,330,711 A | 5/1982 | Ahner et al. | |
| 4,527,067 A * | 7/1985 | Dyck | G21F 5/10 250/506.1 |
| 10,515,730 B2 * | 12/2019 | Singh | G21F 5/12 |
| 2005/0207525 A1 * | 9/2005 | Singh | G21F 5/00 376/272 |
| 2005/0213698 A1 * | 9/2005 | Morishige | G21F 5/005 376/272 |
| 2005/0220255 A1 | 10/2005 | Hermouet et al. | |
| 2006/0291609 A1 * | 12/2006 | Pennington | G21F 5/10 376/272 |
| 2009/0178944 A1 * | 7/2009 | Bontemps | G21F 9/34 206/443 |
| 2011/0172484 A1 * | 7/2011 | Singh | G21F 5/002 588/16 |
| 2014/0329455 A1 * | 11/2014 | Singh | G21F 5/10 454/237 |
| 2016/0019991 A1 * | 1/2016 | Dederer | G21F 5/008 376/272 |
| 2017/0108396 A1 * | 4/2017 | Takeda | G01M 3/002 |
| 2017/0125132 A1 * | 5/2017 | Takeda | G21F 5/10 |
| 2018/0068752 A1 * | 3/2018 | Bardon | B60H 1/00264 |
| 2018/0130566 A1 * | 5/2018 | Hida | G21F 5/005 |

FOREIGN PATENT DOCUMENTS

| | | | |
|---|---|---|---|
| JP | 10-186092 A | * | 12/1996 |
| JP | 10-186092 A | | 7/1998 |
| JP | 2001-141883 A | | 5/2001 |
| JP | 2002-048893 A | | 2/2002 |
| JP | 2004-069473 A | | 3/2004 |
| JP | 2005-207751 A | | 8/2005 |
| JP | 2005-208062 A | | 8/2005 |
| JP | 2007-108052 A | | 4/2007 |

OTHER PUBLICATIONS

Office Action dated May 26, 2020 issued in corresponding Japanese Patent Application No. 2016-192386 with English translation.
Alia Mohamed Al-Ghafri et al., "Numerical Investigation to Examine Dust Impacts on the Dry Cask Passive Cooling Under UAE Harsh Environmental Conditions", Proceedings of the 24th International Conference Nuclear Energy for New Europe, Nuclear Energy for New Europe, 2015, pp. 206.1-206.9.

* cited by examiner

-- Prior Art --

FIG. 13

-- Prior Art --

CONCRETE CASK

CROSS-REFERENCE TO RELATED APPLICATIONS

This application is the U.S. National Phase of PCT/JP2017/034661, filed Sep. 26, 2017, which claims the benefit of priority from Japanese Patent Application Serial No. 2016-192386 filed Sep. 30, 2016, the contents of each of which are hereby incorporated by reference in entirety.

TECHNICAL FIELD

A dedicated container for storing or conveying spent nuclear fuel (hereinafter, referred to as spent fuel) taken out of a nuclear reactor is referred to as a cask. As a type of this cask, there are a so-called metal cask for accommodating spent fuel in an extremely thick metal cylinder in a tightly closed state, and a so-called concrete cask for accommodating spent fuel in a metal container called a canister thinner than the metal cylinder in a tightly closed state, and accommodating this canister in a cylindrical thick concrete container body. As a material of the metal cylinder of the metal cask or the canister of the concrete cask, metal unlikely to get rusted such as stainless steel is used.

In the concrete cask, the canister is stored in the concrete container body, and therefore the metal thickness of the canister can be made drastically thinner than the metal thickness of the metal cask, and the amount of metal to be used can be drastically reduced. Therefore, the manufacturing cost of the entire concrete cask including the concrete container body and the canister can be reduced compared to the metal cask. The concrete cask is disclosed in, for example, Patent Literatures 1, 2 and the like.

The spent fuel generates decay heat. Therefore, in the concrete cask, in order to suppress excessive temperature rise due to the decay heat, as simply illustrated in FIG. 12 and FIG. 13, a container body 101 and a canister 102 are disposed in a state of having a gap formed from a cooling passage 103 between the internal peripheral surface of the container body 101 and the external peripheral surface of the canister 102, and air introduction passages 104 leading to the bottom end part of this cooling passage 103, and air discharge passages 105 leading to the top end part of the cooling passage 103 are provided so as to radially penetrate the container body 101. Reference numeral 101a denotes a lid of the container body 101. Cooling air is introduced in the bottom end part of the cooling passage 103 through the air introduction passages 104, and thereafter is naturally circulated upward while being warmed by decay heat emitted from the canister 102 (that is, while absorbing this decay heat), and is discharged from the air discharge passages 105 connected to the top end part of the cooling passage 103.

Figure 12:
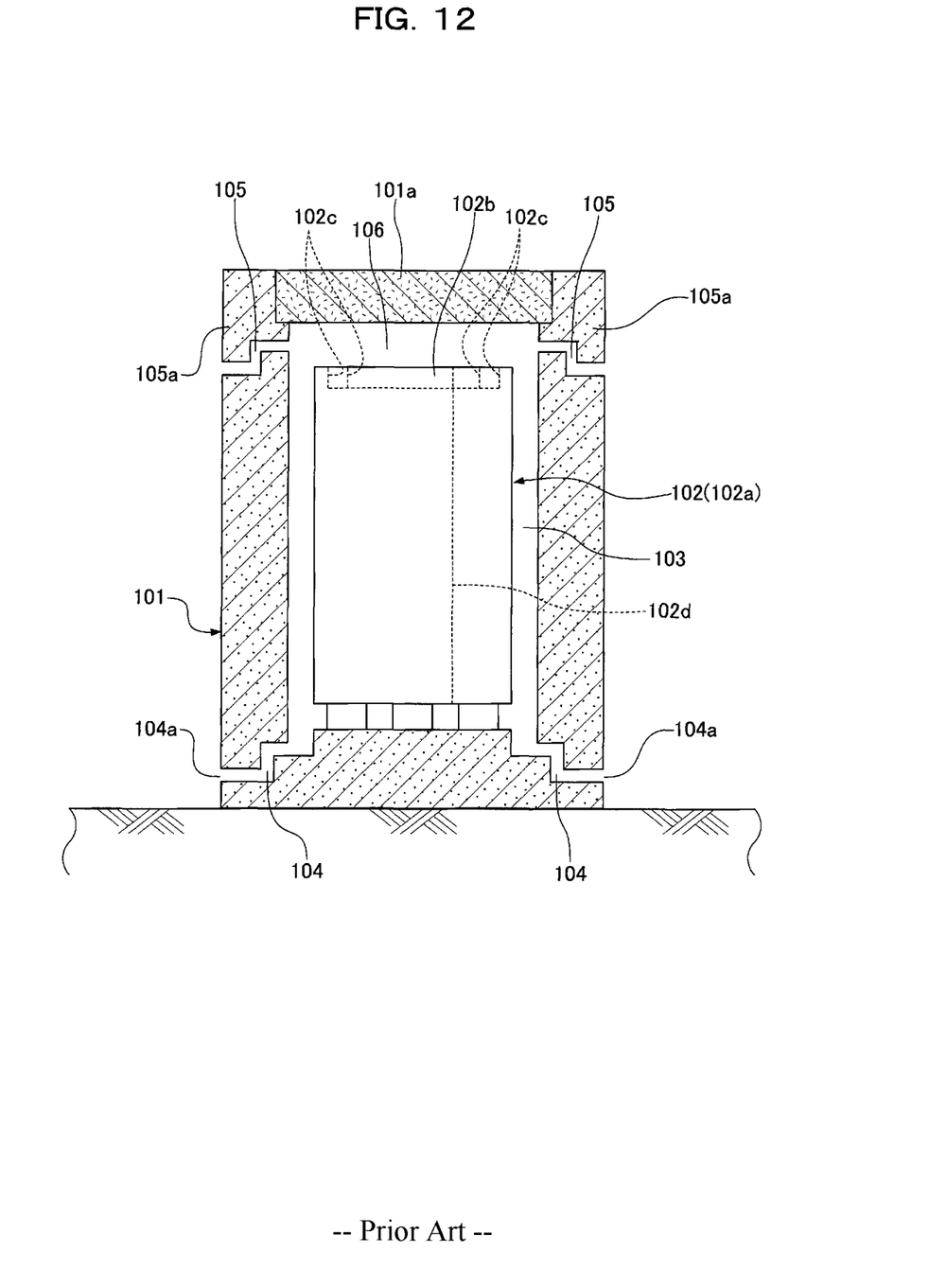
FIG. 12 is a sectional front view of a conventional concrete cask.
Figure 13:
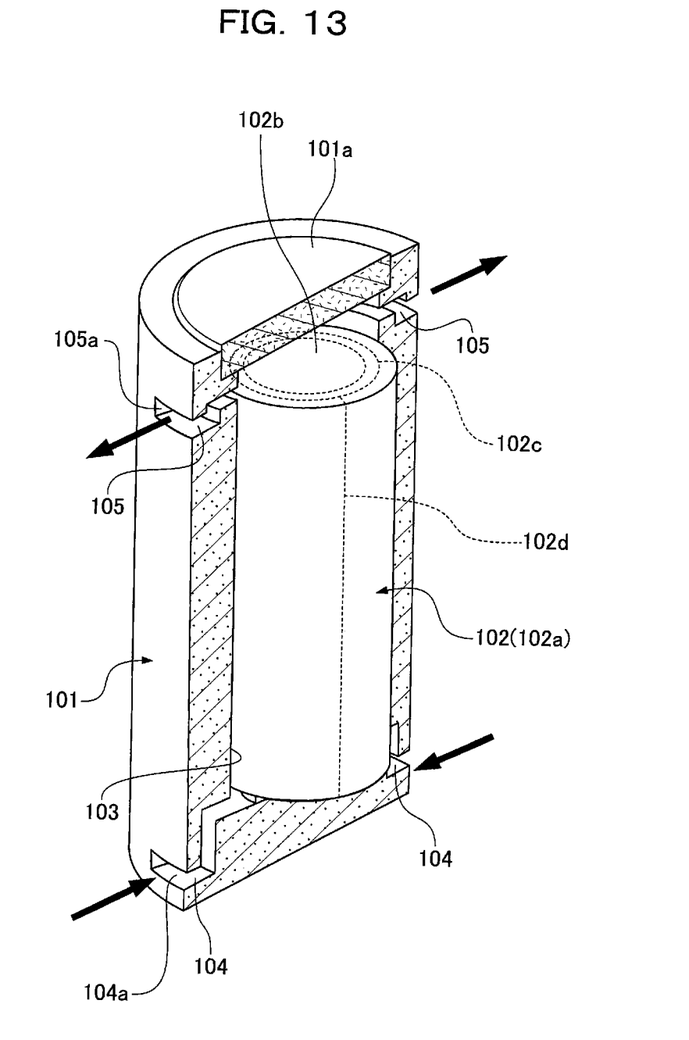
FIG. 13 is a partially cutout perspective view of the conventional concrete cask.

In order to discharge the decay heat emitted from the top surface of the canister 102, a top space 106 is provided between the top surface of the canister 102 and the lid 101a of the container body 101. Air of this top space 106 is led to the top end part of the cooling passage 103, and is discharged from the air discharge passages 105 together with the cooling air of the cooling passage 103.

As simply illustrated in FIG. 12 and FIG. 13, the air introduction passages 104 and the air discharge passages 105 are provided with bent parts or the like in the middle of the passages, and are configured such that radioactive rays do not leak out (or are unlikely to leak out) through the air introduction passages 104 and the air discharge passages 105. In FIG. 12 and FIG. 13, reference numeral 104a denotes an air inlet, and reference numeral 105a denotes an air outlet.

The cylindrical canister 102 is composed of a canister body 102a having a bottomed cylindrical shape with an open top surface, and a lid 102b for closing an opening of the top surface of the canister body 102a. The cylindrical canister 102 has a sealed structure by closing the opening of the top surface of the canister body 102a with the lid 102b to be welded, after accommodating the spent fuel in the canister body 102a.

The canister body 102a is manufactured by first curving a rectangular plate-like metal plate and welding the curved metal plate to manufacture a body, and then joining a bottom surface part to this body by welding, at a place without radioactivity such as a factory. On the other hand, the lid 102b is welded to be joined after spent fuel taken out of the nuclear reactor is accommodated in the canister body 102a, and therefore is weld and joined to the canister body 102a by using a robot or the like in high-concentration radioactivity atmosphere such as a fuel outlet of the nuclear reactor. Reference numeral 102c in FIG. 12 and FIG. 13 denotes a lid welded part, and reference numeral 102d denotes a side surface welded part.

CITATION LIST

Patent Literature

Patent Literature 1

Japanese Patent Laid-Open No. 2001-141883

Patent Literature 2

Japanese Patent Laid-Open No. 2007-108052

SUMMARY OF INVENTION

Technical Problem

Japan is an island country surrounded by the sea, and therefore there are more than a few possibilities that a storage area of the concrete cask is a coast. In this case, air containing salt from sea water is introduced in the cooling passage 103 of the concrete cask. When the air introduced in the cooling passage 103 contains salt and the humidity becomes high due to condensation on the surface of the canister 102, there is a possibility that the salt is dissolved in water of humid air, and the dissolved chloride ions causes rust or corrosion to occur in a portion in which tensile stress remains in the metal canister 102, resulting in stress corrosion cracking (SCC: Stress Corrosion Cracking).

Herein, the canister body 102a is manufactured in a factory or the like, and therefore can be freely worked such that tensile stress does not remain, by burnishing a welded part such as the side surface welded part 102d, or the like. On the other hand, the lid welded part 102c in the canister 102 is welded in the high-concentration radioactivity atmosphere, and therefore it is difficult to work the lid welded part such that tensile stress does not remain after welding. Accordingly, in the conventional concrete cask, there is a possibility that stress corrosion cracking (SCC) occurs in the lid welded part 102c of the canister 102.

The present invention solves the aforementioned problem, and an object of the present invention is to provide a concrete cask enabling suppression of occurrence of stress corrosion cracking (SCC) in a lid welded part of a canister.

Solution to Problem

In order to solve the aforementioned problem, a concrete cask according to the present invention including: a metal canister accommodating spent fuel; a concrete container body for accommodating the canister inside the container body; a cooling passage provided between the external peripheral surface of the canister and the internal peripheral surface of the container body, and allowing air for cooling the external peripheral surface of the canister to pass; and a top space provided between a top surface of the canister and inside of a lid of the container body, wherein a baffle plate for suppressing introduction of air rising through the cooling passage to the top space is provided.

According to this configuration, direct introduction of air rising through the cooling passage to the top space is suppressed by the baffle plate. As a result, even in a case in which the air introduced inside the container body contains salt, the air containing the salt is unlikely to directly come into contact with the top surface including the lid welded part of the canister, and it is possible to suppress generation of chloride ions on the surface of the canister, particularly, the top surface including the lid welded part, and occurrence of stress corrosion cracking.

It is suitable that the baffle plate is mounted on the top external peripheral surface of the canister, and has such a shape that the external periphery expands toward the top. According to this configuration, it is possible to satisfactorily suppress introduction of air rising through the cooling passage to the top space.

A mounting bracket for mounting the baffle plate on the canister may be provided, and the baffle plate may be mounted on the top end part of the canister or near the top end part of the canister by the mounting bracket.

It is suitable that a material having a coefficient of thermal expansion smaller than the coefficient of thermal expansion of a metal material forming the canister is used as the mounting bracket. According to this configuration, when the temperature of the canister is increased by decay heat of the spent fuel, the coefficient of thermal expansion of the canister is larger than the coefficient of thermal expansion of the mounting bracket, and therefore the canister expands more largely than the mounting bracket, and the baffle plate is satisfactorily mounted in a state of being fastened by strong force by the mounting bracket.

A cover plate for covering a lid welded part provided in the top surface of the canister may be mounted. According to this configuration, even in a case in which air containing salt climbs over the baffle plate from the cooling passage to reach the top space, this air is prevented from coming into contact with the lid welded part.

Advantageous Effects of Invention

According to the present invention, a baffle plate for suppressing introduction of air rising through a cooling passage to a top space is provided, so that even in a case in which air introduced in a container body contains salt, the air containing salt is unlikely to directly come into contact with a top surface including a lid welded part of a canister, and it is possible to suppress generation of chloride ions on a surface of the canister, particularly, the top surface including the lid welded part, and occurrence of stress corrosion cracking, and reliability as a concrete cask is improved.

DESCRIPTION OF EMBODIMENTS

Hereinafter, a concrete cask according to an embodiment of the present invention will be described with reference to the drawings.

Figure 1:
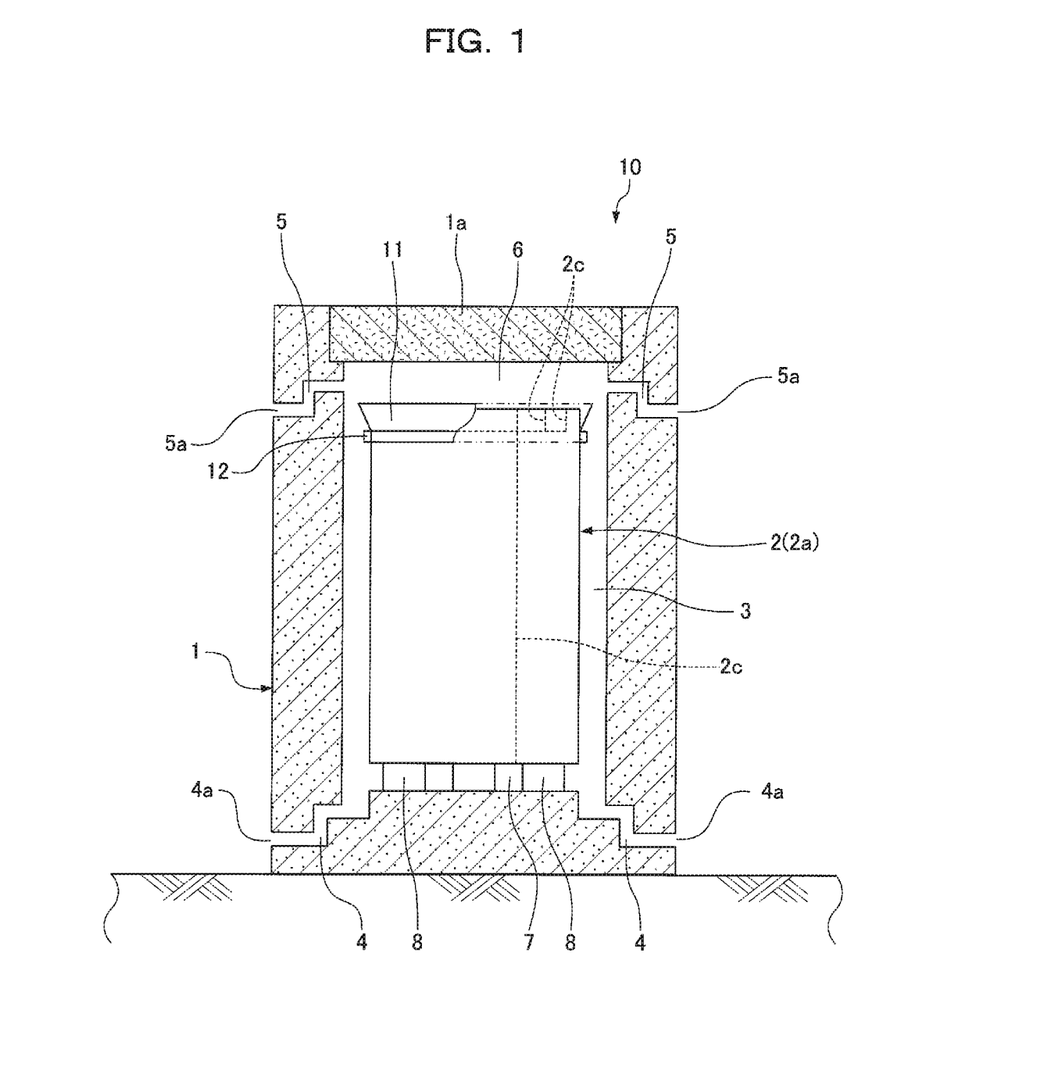
FIG. 1 is a sectional front view of a concrete cask according to an embodiment of the present invention.
Figure 2:
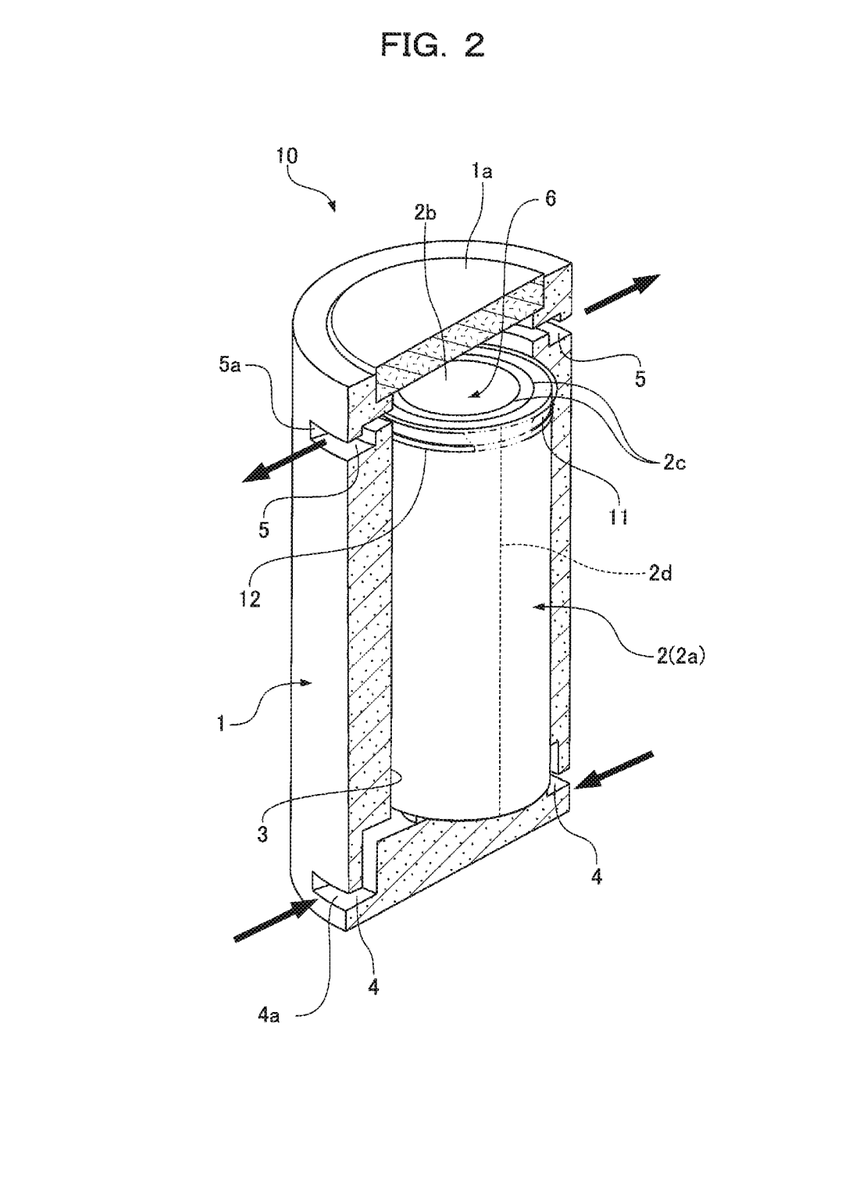
FIG. 2 is a partially cutout perspective view of the concrete cask.

Reference numeral 10 in FIG. 1 and FIG. 2 denotes the concrete cask according to the embodiment (first embodiment) of the present invention. The concrete cask 10 has a cylindrical metal canister 2 for accommodating spent fuel (spent nuclear fuel) in the canister in a tightly closed state, a cylindrical concrete container body 1 for accommodating this canister 2 in the container, and a cooling passage 3 and a top space 6 described below. As a metal material of the canister 2, a metal material unlikely to get rusted such as stainless steel is used.

The spent fuel accommodated in the canister 2 in the tightly closed state generates decay heat, and therefore in the concrete cask 10, in order to suppress excessive temperature rise due to the decay heat, the gap of the substantially cylindrical cooling passage 3 is provided between the internal peripheral surface of the container body 1 and the external peripheral surface of the canister 2, and a gap of the top space 6 is provided between the top surface of the canister 2 and the inside of a lid 1a of the container body 1. Air introduction passages 4 leading to the bottom end part of the cooling passage 3, and air discharge passages 5 leading to the top end part of the cooling passage 3 are each provided at a plurality of portions so as to penetrate the container body 1 radially (in the direction of a radius).

Air for cooling introduced in the bottom end part of the cooling passage 3 through the air introduction passages 4 is naturally circulated upward while being warmed by decay heat emitted from the canister 2 (particularly, the external peripheral surface of the canister 2) (that is, absorbing the decay heat from the canister 2 and cooling the canister 2), and is discharged from the air discharge passages 5 connected to the top end part of the cooling passage 3 to the outside of the concrete cask 10. The top space 6 is connected to the top end part of the cooling passage 3 at the external peripheral part, and the air in the top space 6 is discharged from the air discharge passages 5 to the outside of the concrete cask 10 and the like together with the air in the cooling passage 3, while being warmed by the decay heat emitted from the top surface part of the canister 2 (that is, absorbing the decay heat from the top surface part of the canister 2 and cooling the top surface of the canister 2).

Figure 3:
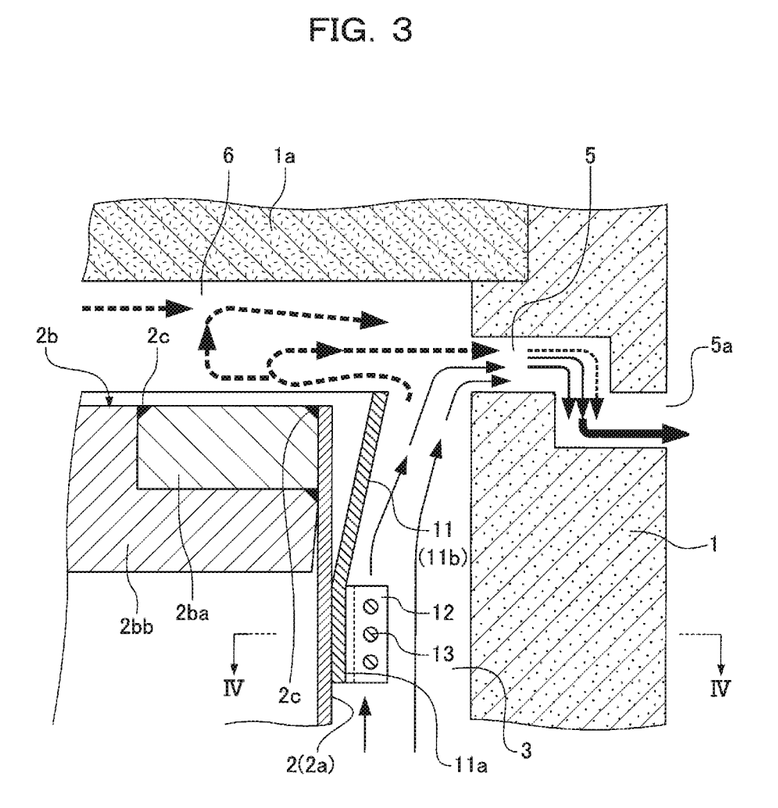
FIG. 3 is a sectional front view of the main part of the concrete cask.

The canister 2 has a structure in which spent fuel (spent nuclear fuel) is accommodated in a body 2a having a bottomed cylindrical shape and having an opened top surface part, and thereafter a lid 2b is fixed to the body 2a by welding or the like, and the inside is sealed. For example, the body 2a is manufactured by curving rectangular sheet metal, and welding curved both end parts to form a cylindrical peripheral surface, and joining a bottom surface part to this cylindrical part by welding. As illustrated in FIG. 3, the lid 2b is composed of, for example, an external peripheral ring-shaped part 2ba, and a central disk-shaped part 2bb having a recessed external periphery. In many cases, in a state in which spent fuel is accommodated in the body 2a, the central disk-shaped part 2bb is first welded to the body 2a, and thereafter the external peripheral ring-shaped part 2ba is fitted into the recessed external peripheral part of the central disk-shaped part 2bb to be fixed by welding or the like. However, the lid is not limited to this. Reference numeral 2c in FIG. 1 to FIG. 3 is a lid welded part (top surface welded part) that joins the body 2a of the canister 2 to the lid 2b, and reference numeral 2d denotes an external peripheral welded part provided so as to substantially linearly extend along the vertical direction in the external peripheral surface of the canister 2.

As illustrated in FIG. 1, the air introduction passages 4 and the air discharge passages 5 are provided with bent parts or the like in the middle of the passages, and are configured such that radioactive rays from the canister 2 do not leak out (or are unlikely to leak out) through the air introduction passages 4 and the air discharge passages 5. In. FIG. 1, reference numeral 4a denotes an air introduction port, and reference numeral 5a denotes an air discharge port. Reference numeral 7 denotes a bottom space leading to the bottom end part of the cooling passage 3 provided between the bottom surface part of the canister 2 and the inside of the bottom surface part of the container body 1, and reference numeral 8 denotes a canister support placed on the bottom surface part of the container body 1, and supporting the canister 2 from below. A structure of directly supporting the canister 2 from below by the bottom surface part of the container body 1 without providing the canister supports 8 may be employed.

As illustrated in FIG. 1 to FIG. 4, in addition to the aforementioned configuration, a baffle plate 11 for suppressing introduction of air rising while passing through the cooling passage 3 to the top space 6 is provided in the concrete cask 10. The baffle plate 11 is mounted over the whole periphery on the top external peripheral surface (external peripheral surface near the top end part) of the canister 2 by a mounting bracket 12.

The baffle plate 11 has a ring-shaped (annular) schematic whole shape, and is composed of a mounting part 11a mounted along the top external peripheral surface of the canister 2 by the mounting bracket 12, and a baffling part 11b continuous to the top of this mounting part 11a, as illustrated in FIG. 3, in this embodiment. In a state in which the mounting part 11a at the bottom end part of the baffle plate 11 is in close contact with the top external peripheral surface of the canister 2, the mounting bracket 12 is wound from the external peripheral side of the baffle plate 11, and mounted on the top external peripheral surface of the canister 2. The baffle plate 11 (specifically, the baffling part 11b of the baffle plate 11) has a sectional shape in which the external periphery obliquely expands toward the top. As the baffle plate 11 extends upward from the bottom end part of the baffling part 11b, the baffle plate 11 separates from the top external peripheral surface of the canister 2 and comes close to the internal peripheral surface of the container body 1. Therefore, the baffle plate 11 is configured such that a clearance between the top end (top edge) of the baffle plate 11 and the internal peripheral surface of the container body 1 is smaller than a clearance between the bottom end part of the baffle plate 11 and the internal peripheral surface of the container body 1.

Figure 4:
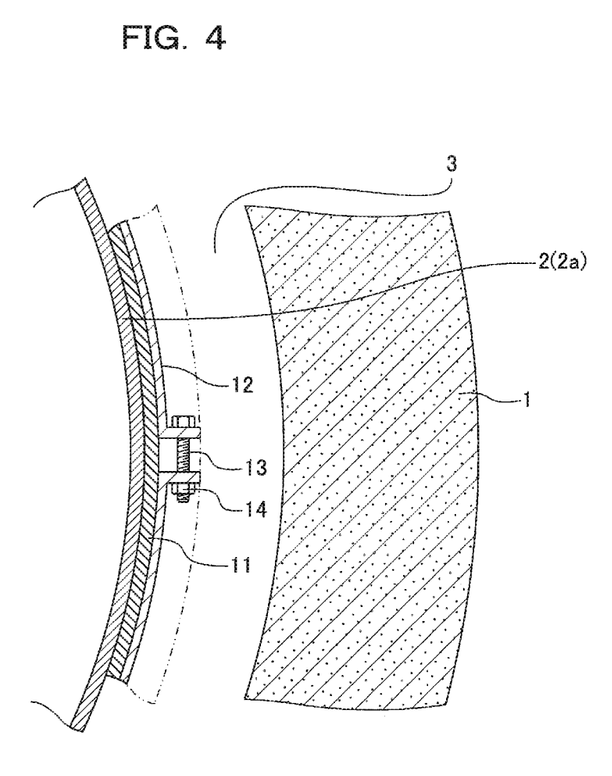
FIG. 4 is a sectional plan view of the main part of the concrete cask.

The mounting bracket 12 is formed of, for example, a flexible thin belt material, and fixes the baffle plate 11 in a state in which the both ends are fastened by bolts 13, nuts 14, and the like, as illustrated in FIG. 4. In place of this, a pair of halved mounting brackets each having a semicircular shape in a plan view may be fixed to each other by bolts 13, nuts 14, and the like. Herein, the mounting bracket 12 has a coefficient of thermal expansion smaller than the coefficient of thermal expansion of a metal material forming the canister 2.

In the concrete cask 10 having the aforementioned structures, air for cooling is introduced in the bottom end part of the cooling passage 3 through the air introduction passages 4, and thereafter is naturally circulated upward while being warmed by decay heat emitted from the canister 102 (that is, absorbing this decay heat), and is discharged from the air discharge passages 5 connected to the top end part of the cooling passage 3.

In this case, the baffle plate 11 is mounted over the whole periphery on the top external peripheral surface (external peripheral surface near the top end) of the canister 2, and therefore as illustrated by the solid arrows in FIG. 3, the air rising while passing through the cooling passage 3 is guided to the top external peripheral side region of the cooling passage 3 provided with the air discharge passages 5 along the baffle plate 11. Then, the air is discharged from the air discharge passages 5 to the outside.

However, the top end part of the cooling passage 3 is continuous to a gap of the top space 6 between the top surface of the canister 2 and the inside of the lid 1a of the container body 1, and therefore one part of the air rising while passing through the cooling passage 3 flows into the top space 6, and the air in the top space 6 is discharged from the air discharge passages 5 together with the air in the cooling passage 3 to be discharged from the air discharge passages 5 to the outside, as illustrated by the dotted arrows in FIG. 3. That is, while a part of the air rising while passing through the cooling passage 3 flows into the top space 6, most of the air is guided to the top external peripheral side region of the cooling passage 3 along the baffle plate 11, and is discharged from the air discharge passages 5 to the outside. Thus, direct introduction of the air rising while passing through the cooling passage 3 to the top space 6 is suppressed by the baffle plate 11.

As described above, the canister body 2a of the canister 2 is manufactured in a factory or the like, and therefore can be freely worked such that tensile stress does not remain, for example, by burnishing a welded part such as the side surface welded part 2d. On the other hand, the lid welded part 2c in the canister 2 is welded in high-concentration radioactivity atmosphere, and therefore it is difficult to work the lid welded part such that tensile stress does not remain after welding. Accordingly, in the conventional concrete cask, there is a possibility that stress corrosion cracking (SCC) occurs in the lid welded part of the canister.

On the contrary to this, in this configuration, the direct introduction of the air rising while passing through the cooling passage 3 to the top space 6 is suppressed by the baffle plate 11, and therefore even in a case in which the air introduced in the cooling passage inside the container body 1 contains salt, the air containing the salt is unlikely to directly come into contact with the top surface part of the canister 2, and it is possible to suppress generation of chloride ions on the surface of the canister 2, particularly, the top surface including the lid welded part 2c, and occurrence of stress corrosion cracking.

In the aforementioned configuration, the mounting bracket 12 has the coefficient of thermal expansion smaller than the coefficient of thermal expansion of the metal material forming the canister 2. Therefore, when the temperatures of the canister 2, the baffle plate 11 and the mounting bracket 12 are increased by the decay heat of the spent fuel, as the coefficient of thermal expansion of the canister 2 is larger than the coefficient of thermal expansion of the mounting bracket 12, the canister 2 expands more largely than the mounting bracket 12. As a result, the baffle plate 11 is satisfactorily mounted in a state of being fastened by stronger force by the mounting bracket 12. Consequently, the baffle plate 11 can be more reliably prevented from dropping out of a mounting position of the canister 2, and reliability as the concrete cask 10 is improved.

Figure 5:
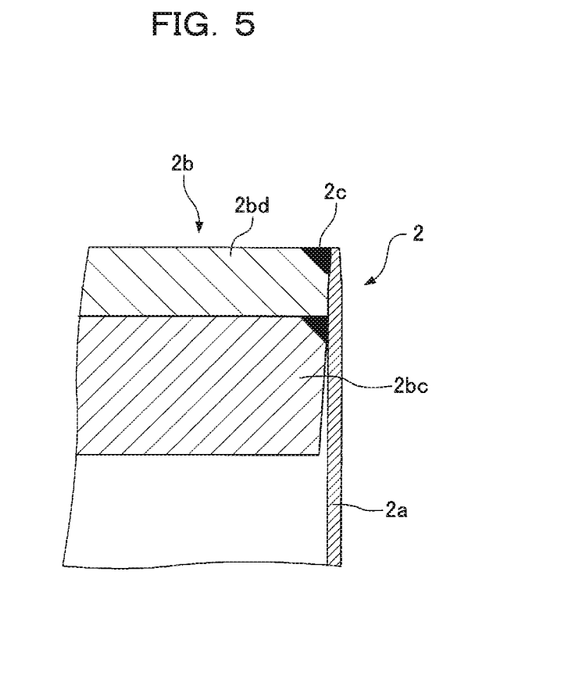
FIG. 5 is a sectional view of the main part of a modification of a canister of the concrete cask.
Figure 6:
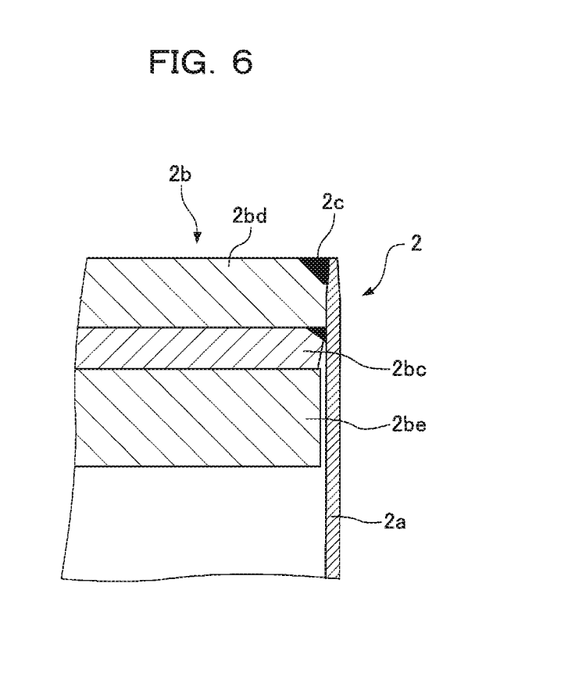
FIG. 6 is a sectional view of the main part of another modification of a canister of the concrete cask.

In the aforementioned embodiment, a structure in which the lid 2b of the canister 2 is composed of the external peripheral ring-shaped part 2ba, and the central disk-shaped part 2bb having the recessed external periphery is already described. However, the present invention is not limited to this. As illustrated in FIG. 5, even in a case in which a lid 2b of a canister 2 is composed of a primary lid 2bc first closed on the inside of a top surface opening of a canister body 2a to be welded, and a secondary lid 2bd further welded on the outside of this primary lid 2bc, a similar working effect is obtained. As illustrated in FIG. 6, even in a case in which a primary lid 2bc in a lid 2b of a canister 2 is thinner than the aforementioned primary lid 2bc, and a shielding lid 2be is further provided on the inside of the primary lid 2bc, a similar working effect is obtained.

Figure 7:
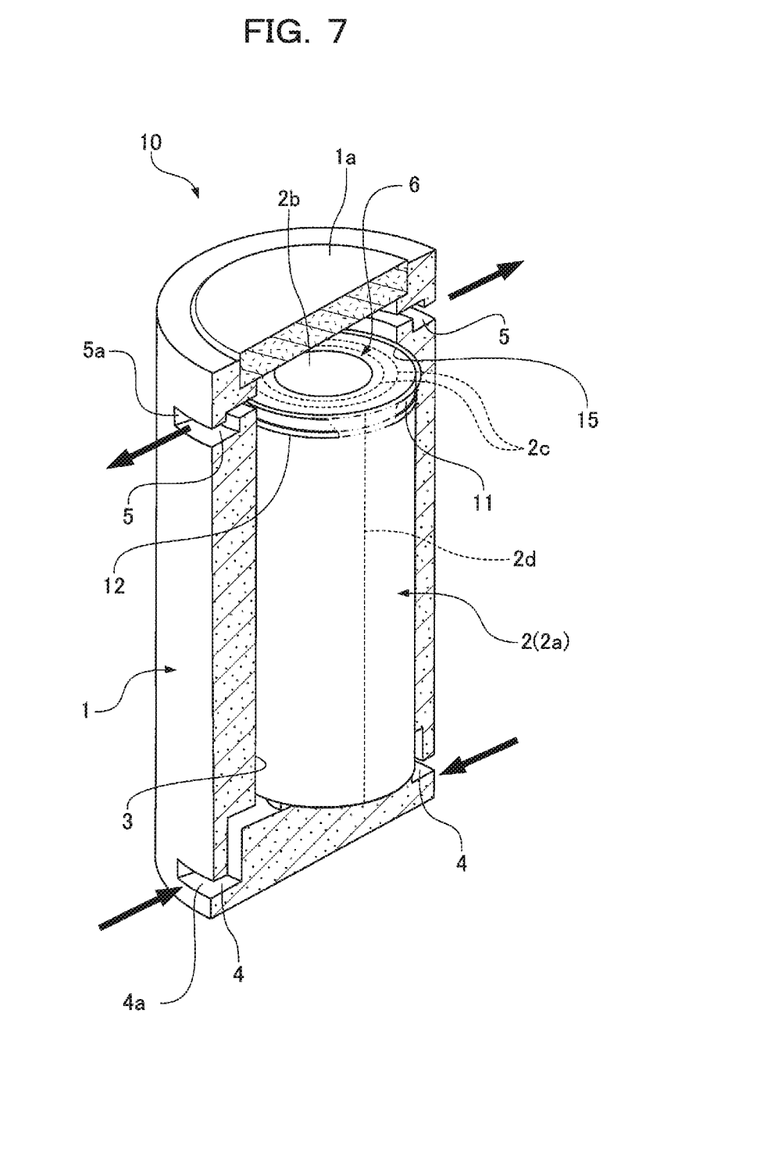
FIG. 7 is a partially cutout perspective view of a concrete cask according to another embodiment of the present invention.
Figure 8:
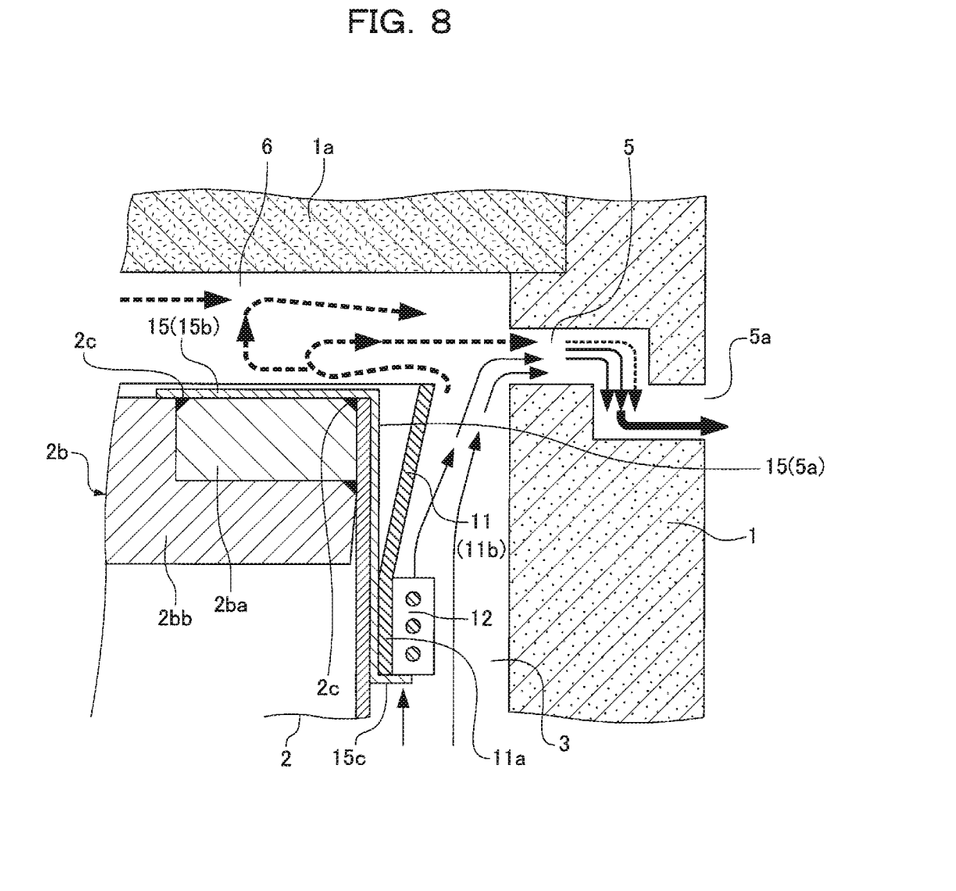
FIG. 8 is a sectional front view of the main part of the concrete cask.

FIG. 7 and FIG. 8 are a partially cutout perspective view and a main part sectional front view of a concrete cask 10 according to another embodiment of the present invention. In this concrete cask 10, in addition to the configuration of the aforementioned embodiment, a cover plate 15 covering the top surface part of a canister 2 is mounted on a baffle plate 11. As a constituent material of the cover plate 15, a metal material unlikely to get rusted such as stainless steel is preferable. However, the constituent material is not limited to this, and a resin material or the like may be used.

The cover plate 15 is mounted on the top external peripheral surface and the like of the canister 2 over the whole periphery in a state of being interposed between the baffle plate 11 and the external peripheral surface of the canister 2, similarly to the baffle plate 11. As illustrated in FIG. 8, the cover plate 15 is composed of a cylindrical part 15a extending upward along the top external peripheral surface of the canister 2, and a cover part 15b extending in the radially inward direction from the upper end of the cylindrical part, and covering the top surface part of the canister 2, and a holding part 15c extending to the external peripheral side such as a flange shape from the bottom end part of the cylindrical part 15a, and supporting the bottom end part of the baffle plate 11 (or the bottom end part of the baffle plate 11 and the bottom end part of the mounting bracket 12) from below. The cover part 15b extends in the radially inward direction up to such a position as to cover the lid welded part 2c in the top surface part of the canister 2.

According to the aforementioned configuration, the cover part 15b covers the lid welded part 2c at the top surface part of the canister 2, and therefore even in a case in which air containing salt climbs over the baffle plate 11 from the cooling passage 3 to reach the top space 6, this air is prevented from coming into contact with the lid welded part 2c. Consequently, it is possible to more reliably prevent generation of chloride ions on the surface of the canister 2, particularly, the surface of the top surface part including the lid welded part 2c, and occurrence of stress corrosion cracking, and reliability as the concrete cask 10 is improved.

According to this configuration, the cover plate 15 is mounted together with the baffle plate 11 by the mounting bracket 12, and this cover plate 15 (specifically, the cover part 15b of the cover plate 15) covers the top surface part of the canister 2, and therefore even in a case in which tightening force by the mounting bracket 12 is weakened, the baffle plate 11 (or the baffle plate 11 and the mounting bracket 12) is held from below by the cover plate 15, and the baffle plate 11 (or the baffle plate 11 and the mounting bracket 12) is prevented from dropping off. Consequently, reliability as the concrete cask 10 is improved.

Figure 9:
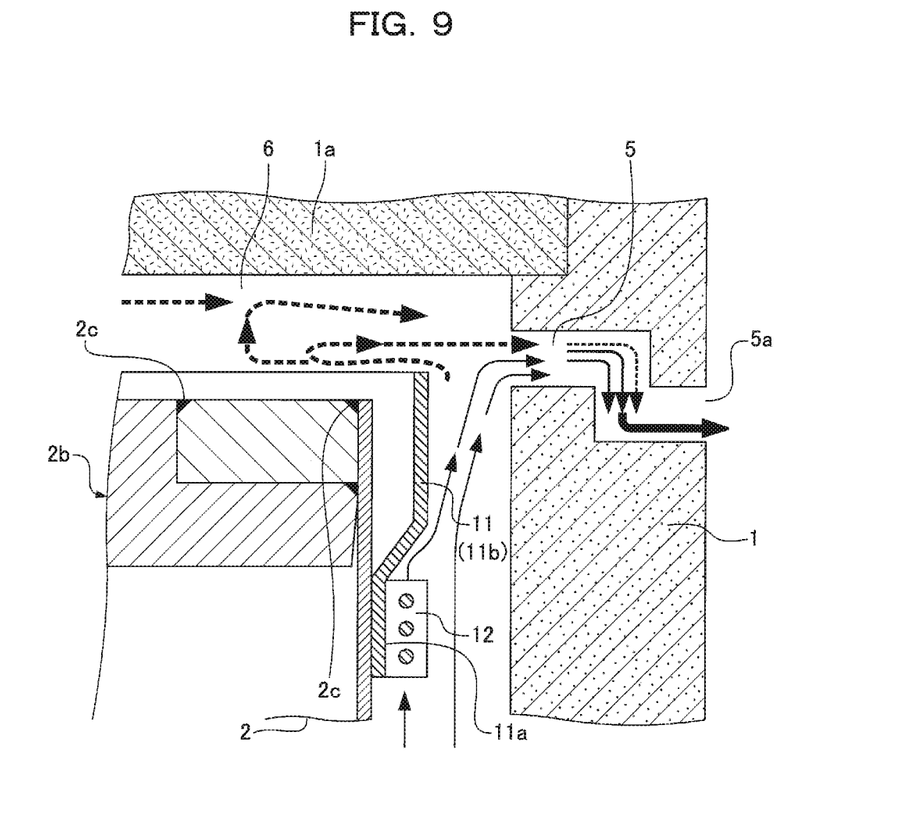
FIG. 9 is a sectional front view of the main part of a modification of the concrete cask.

In the aforementioned embodiment, the baffling part 11b of the baffle plate 11 has such a sectional shape that the external periphery uniformly expands obliquely toward the top. However, the prevent invention is not limited to this. As illustrated in FIG. 9, only a part (central part in the vertical direction in this modification) of a baffling part may have such a shape that the external periphery uniformly expands obliquely toward the top, or such a shape that the external periphery expands stepwise toward the top (not illustrated). In this configuration, a cover plate 15 similar to FIG. 8 may be provided (not illustrated).

Figure 10:
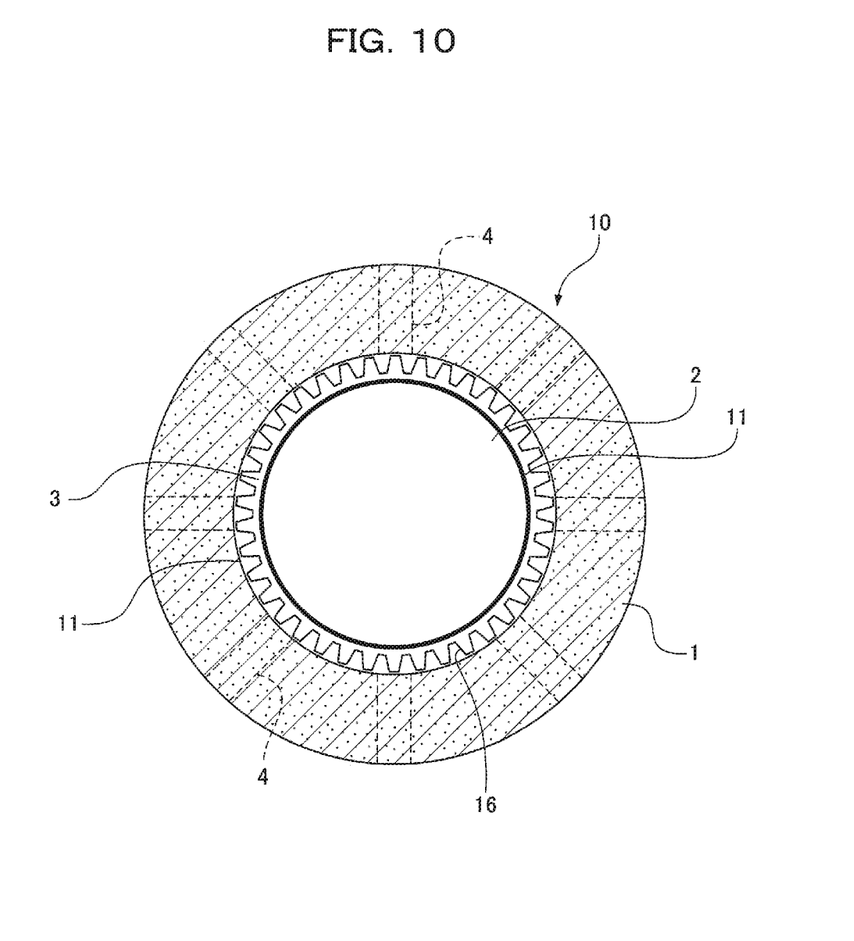
FIG. 10 is a sectional plan view of the main part of a concrete cask according to another embodiment of the present invention.
Figure 11:
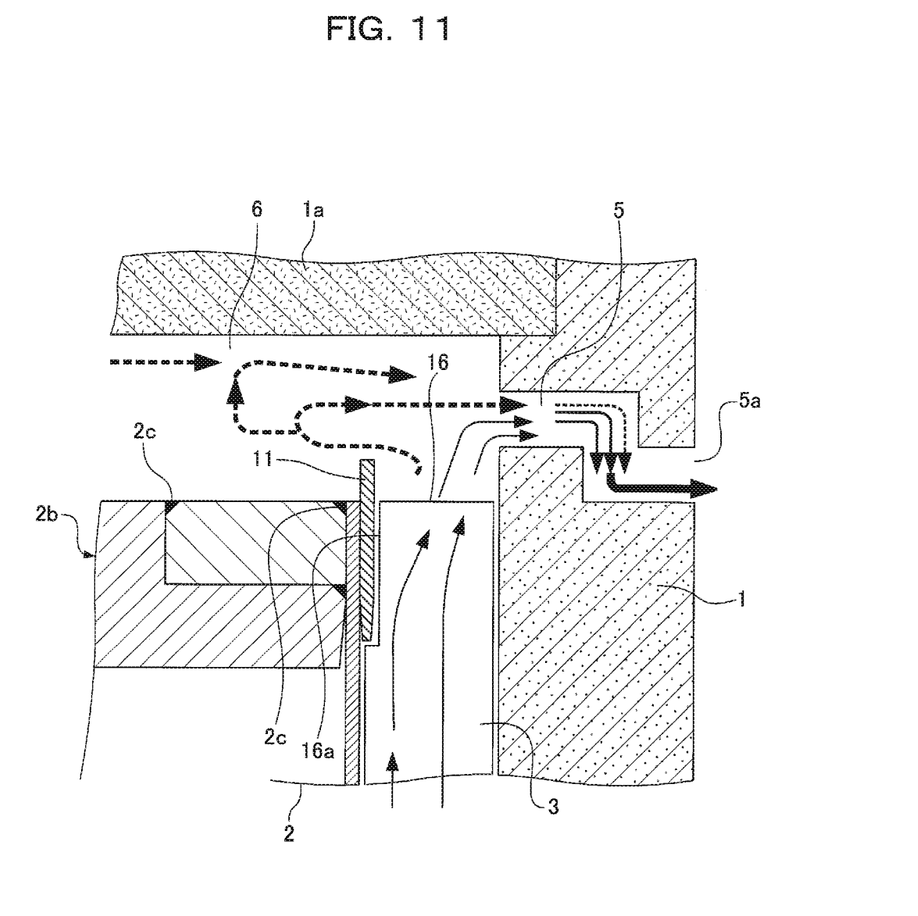
FIG. 11 is a sectional front view of the main part of the concrete cask.

As simply illustrated in FIG. 10 and FIG. 11, a member 16 for mounting for also functioning as, for example, a spacer may be disposed between the external peripheral surface of a canister 2 and the internal peripheral surface of a container body 1 (that is, a cooling passage 3), in a state of not hindering the vertical flow of air in a cooling passage 3 much. A groove part (recessed part) 16a for placing a baffle plate 11 may be formed in the top part of this member 16 for mounting, and the baffle plate 11 may be supported by this groove part (recessed part) 16a.

The invention claimed is:
1. A concrete cask comprising:
a metal canister accommodating spent fuel;
a concrete container body for accommodating the canister inside the container body;
a cooling passage provided between an external peripheral surface of the canister and an internal peripheral surface of the container body, and allowing air for cooling the external peripheral surface of the canister to pass; and
a top space provided between a top surface of the canister, and inside of a lid of the container body, wherein a baffle plate for suppressing introduction of air rising through the cooling passage to the top space is provided, wherein the baffle plate is mounted on a top external peripheral surface of the canister, and has such a shape that an external periphery around a top end of the canister expands towards a top.

2. The concrete cask according to claim 1, wherein a cover plate for covering a lid welded part provided at the top surface of the canister.

3. A concrete cask comprising:

a metal canister accommodating spent fuel;

a concrete container body for accommodating the canister inside the container body;

a cooling passage provided between an external peripheral surface of the canister and an internal peripheral surface of the container body, and allowing air for cooling the external peripheral surface of the canister to pass; and a top space provided between a top surface of the canister, and inside of a lid of the container body, wherein a baffle plate for suppressing of air arising through the cooling passage to the top space is provided, wherein a mounting bracket for mounting the baffle plate on the canister is provided, and the baffle plate is mounted on a top end part of the canister or near the top end part of the canister by the mounting bracket.

4. The concrete cask according to claim 3, wherein a coefficient of thermal expansion of the mounting bracket is smaller than a coefficient of thermal expansion of a metal material forming the canister.

* * * * *